(12) United States Patent
Moor et al.

(10) Patent No.: US 9,624,041 B2
(45) Date of Patent: Apr. 18, 2017

(54) CONVEYING DEVICE WITH AN EXTENSIVELY EXTENDED CONVEYING ELEMENT

(71) Applicant: WRH Walter Reist Holding AG, Ermatingen (CH)

(72) Inventors: René Moor, Pfungen (CH); Michael Fischer, Weinfelden (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 14/864,010

(22) Filed: Sep. 24, 2015

(65) Prior Publication Data

US 2016/0090245 A1    Mar. 31, 2016

(30) Foreign Application Priority Data

Sep. 26, 2014  (DE) .................. 10 2014 114 018
Sep. 26, 2014  (DE) .................. 20 2014 104 665 U

(51) Int. Cl.
  *B65G 45/12*   (2006.01)
  *B65G 45/14*   (2006.01)
  (Continued)

(52) U.S. Cl.
  CPC ............. *B65G 45/14* (2013.01); *B65G 45/12* (2013.01); *B65G 45/26* (2013.01); *B65G 45/105* (2013.01)

(58) Field of Classification Search
  CPC ....... B66B 31/00; B66B 31/003; B66B 23/12; B65G 45/12
  (Continued)

(56) References Cited

U.S. PATENT DOCUMENTS 2,782,896 A   2/1957  Kendall et al.
2,862,599 A  12/1958  Sinden et al.
(Continued)

FOREIGN PATENT DOCUMENTS

AT    505 662       3/2009
AU    38474/72      8/1973
(Continued)

OTHER PUBLICATIONS

German Search Report dated May 27, 2015, Application No. 10 2014 114 018.4.
(Continued)

*Primary Examiner* — James R Bidwell
(74) *Attorney, Agent, or Firm* — Rankin, Hill & Clark LLP

(57) ABSTRACT

A conveying device with a revolvingly led, extensively extended conveying element, which forms a conveying section with a conveying surface, and a return section, which is arranged below the conveying section. The conveying element is deflected in each case in two head-end regions, which are spaced from one another along the conveying direction. A wiper device for wiping foreign objects led along on the conveying surface of the conveying element is arranged in the front head-end region, in which the conveying element is deflected from the conveying section into the return section. The wiper device includes a wiper unit with a receiving blade, which runs transversely to the conveying direction, as well as a wiper blade, which is mounted on the wiper unit and forms a flexible wiper lip projecting toward the conveying element beyond the receiving blade.

15 Claims, 7 Drawing Sheets

(51) Int. Cl.
*B65G 45/26* (2006.01)
*B65G 45/10* (2006.01)

(58) Field of Classification Search
USPC .................................. 198/335, 497, 499
See application file for complete search history.

(56) References Cited

U.S. PATENT DOCUMENTS

| | | | | |
|---|---|---|---|---|
| 3,132,733 | A * | 5/1964 | Boman | B66B 29/06 198/323 |
| 5,223,128 | A * | 6/1993 | Combrowski | B01D 17/0202 198/497 |
| 5,234,095 | A * | 8/1993 | Patin | B66B 21/12 198/324 |
| 5,423,408 | A | 6/1995 | Loder | |
| 8,443,962 | B2 * | 5/2013 | Kaneyama | G03G 15/161 198/497 |
| 2006/0202783 | A1 * | 9/2006 | Lopez | H01P 1/20372 333/202 |

FOREIGN PATENT DOCUMENTS

| | | |
|---|---|---|
| CN | 103086139 | 5/2013 |
| DE | 28 40 803 | 4/1980 |
| DE | 84 07 606 | 12/1985 |
| DE | 197 46 348 | 4/1999 |
| DE | 10 2005 041 523 | 3/2007 |
| DE | 10 2006 010 974 | 9/2007 |
| DE | 60 2004 009 477 | 7/2008 |
| EP | 1 743 855 | 1/2007 |
| JP | 2-75596 | 3/1990 |
| JP | 11-106024 | 4/1999 |
| WO | 02/053823 | 7/2003 |

OTHER PUBLICATIONS

European Search Report dated Jun. 17, 2016, Application No. 15185990.7.

* cited by examiner

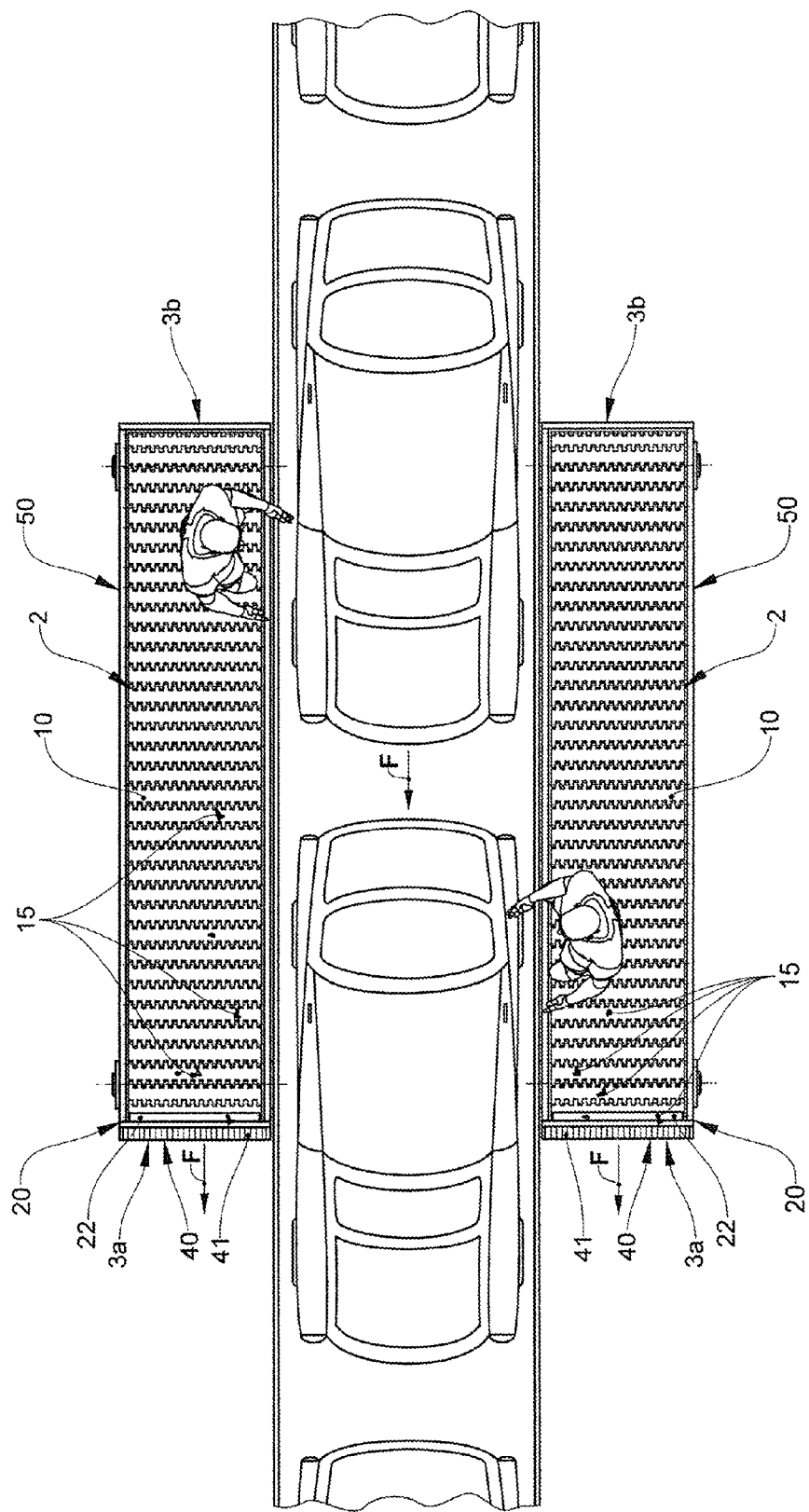

CONVEYING DEVICE WITH AN EXTENSIVELY EXTENDED CONVEYING ELEMENT

BACKGROUND OF THE INVENTION

Field of the Invention

The invention relates to the field of conveying technology and concerns a conveying device with a revolvingly guided, extensively (two-dimensionally) extended conveying element which forms a conveying section with a conveying surface, and a return section arranged below the conveying section, and the conveying element is deflected in each case into two head-end regions spaced from one another along the conveying direction.

Description of Related Art

The head-end regions correspond to the end sections of the conveying device, in which end sections the conveying section of the conveying element is deflected via a deflecting element into the return section and vice versa. The conveying element in the head-end region in particular is deflected by an angle of 180° (angle degrees) in each case. The head-ends form the face-side termination of the head-end regions.

Conveying devices with a revolving, extensively extended conveying element such as a conveyor belt or mat chain are known from the state of the art. The conveying elements as a rule are driven via deflection shaft at one or two deflection locations.

The conveying element is guided in a sliding manner, e.g., on slide rails, for supporting the conveying element in the region of the conveying section between the defection locations, in which region the conveyed product lies on the conveying element. Conveying devices, with which the conveying element is supported in a rolling manner between the deflection locations, are also known.

The mentioned conveying devices in particular are applied as worker-rider belts. Worker-rider belts are designed in order to carry persons working along a production line or on a conveyor belt, and to convey them at least temporarily or continuously in the production direction, so that the persons working in the production line or on the conveyor belt are moved along with the manufactured goods conveyed through the production line or on the conveyor belt. Worker-rider belts are characterised by a low construction height.

Thus DE 10 2006 010 974 describes a worker-rider belt (worker belt) with a conveyor belt as well as an essentially horizontal guide frame with two lateral sidewalls extending horizontally in the longitudinal direction of the conveyor belt. A deflection roller that can be driven by a drive is rotatably mounted on each case at the ends of the worker-rider belt. The drive is arranged between the two sidewalls.

With operation of such worker-rider belts, the operator is confronted with the problem of solid objects, such as small parts like screws, nuts, cable binders, cable sections or clips, falling down onto the conveying element during manufacture, and being conveyed on the conveying element in the conveying direction as foreign objects.

The foreign objects, which are also moved along, entail the danger of these being drawn into the deflection in the front head-end region and getting onto the inside of the conveying device. The terms "front" and "rear" in this context are in relation to the conveying direction.

The foreign matter or objects, which are drawn in can, thus, lead to wearing, damage or even to the destruction of mechanical components, or to the formation of noise. In the worst case, the operation of the conveying device is compromised to such an extent that the conveying device must be stopped and the malfunction overcome, which is to say that the conveying device must be repaired or exchanged.

Defect worker-rider belts must be operationally ready again within a very short time, since the failure of a worker-rider belt can prevent the operation of a production line. Circles of experts talk of maximal stoppage time of 10 minutes.

It is therefore of upmost importance to take care that the causes that can lead to the failure of a worker-rider belt are overcome where possible.

SUMMARY OF THE INVENTION

It is therefore an object of the present invention, to suggest a conveying device of the initially mentioned type, which includes a structure for preventing foreign objects that fall onto the conveying element and are conveyed along with this, from being drawn into the deflection and from getting into the inside of the conveying device.

A further object thereby lies in preventing the foreign objects that are conveyed along on the conveying element from falling from the conveying element onto the floor at the end of the conveying path, spreading on the floor in an uncontrolled manner, contaminating this and, as the case may be, representing a danger for the safety of the workers.

According to the invention, a wiper device for wiping away foreign objects carried along on the conveying surface of the conveying element is arranged in a head-end region which is at the front in the conveying direction and in which the conveying element is deflected from the conveying section into the return section.

The wiper device includes a wiper unit with a receiving blade running transversely to the conveying direction, as well as a wiper blade that is mounted on the wiper unit and that includes a holding section, via which holding section the wiper blade is fastened on the wiper unit.

The wiper blade moreover preferably forms a flexible wiper lip that connects onto the holding section towards the conveying element and projects beyond the receiving blade.

The wiper blade preferably is essentially horizontally mounted. "Essentially horizontally" means that the position of the wiper blade or of parts thereof deviate from the horizontal by 10° (angle degrees) or less, in particular 5° or less.

Objects or subjects in the conveying section are conveyed on the conveying surface in the conveying direction. The conveying section accordingly corresponds to that section of the conveying element that forms the conveying surface.

The conveying direction as a result corresponds to that direction, in which objects or subjects are conveyed in the conveying section of the driven conveying element.

The conveying surface in particular is a plane surface. The conveying surface in particular is aligned horizontally.

The conveying element in one or both head-end regions can be driven via a drive device.

The wiper lip in particular closes the gap between the receiving blade and the conveying element, in the region of the deflection.

The wiper lip can be a bead-like or comb-like end section of the wiper blade. The wiper lip can also be a flat end section strip of the wiper blade. The wiper lip can have a cross section that changes to the holding section. The wiper lip however does not necessarily need to have a cross section changing to the holding section.

The flexible wiper lip preferably bears on the conveying element. This, e.g., can be accomplished by way of the intrinsic weight of the wiper blade. The wiper lip preferably follows the contour of the conveying element that moves past, on account of the intrinsic weight.

The flexible wiper lip in particular is pressed onto the conveying element by way of a biasing. The biasing in particular is an elastic biasing. The wiper lip preferably follows the contour of the conveying element that moves past, on account of the biasing.

The flexible wiper lip in particular is angled obliquely upwards, i.e. is bent obliquely upwards. The bending of the wiper lip has a stabilising effect on its position. Thus, for example, the danger of the wiper lip being pulled downwards into the deflection due to the movement of the conveying element is small.

The face edge of the wiper lip preferably is arranged at the level of the conveying surface or therebelow.

The wiper lip preferably is directed into the deflection of the conveying element. The wiper lip preferably is arranged below the level of the conveying surface in an upper region of the deflection of the conveying element.

The wiper lip preferably consists of a plastic. The plastic can be an elastic plastic. The plastic can have low-friction characteristics.

According to a further development of the invention, the complete wiper blade consists of a plastic mentioned above. The wiper blade preferably as a whole is formed in a flexible manner According to a further development of the invention, the wiper unit forms a receiving groove for the holding section of the wiper blade. The receiving groove is designed in a slot-like manner The receiving groove preferably runs transversely to the conveying direction. The receiving groove preferably is open to the conveying element.

The wiper blade is mounted in the receiving groove via the holding section. The wiper blade preferably is mounted in the receiving groove in a floating manner along an axis transverse to the conveying surface. Transverse to the conveying surface in the case of a horizontal conveying surface means in a vertical alignment.

The wiper blade with its holding section is mounted in the receiving groove preferably with play along an axis transverse to the conveying surface. Thus, the height of the receiving groove can be 1 mm to several millimetres greater than the height of the holding section.

The floating mounting of the wiper blade has the advantage that this to a certain extent can avoid the oscillations which are introduced by the conveying element, or compensate these. The wear of the wiper blade is reduced by way of this. A wiper blade which is designed as a wearing part can moreover be quickly and simply exchanged by way of this. This can also be accomplished without any tools.

The wiper blade can, for example, be inserted or applied with the holding section into the receiving groove. The wiper blade can be secured against sliding out of the receiving groove by way of securing means, which will be described hereinafter.

The holding section preferably is arranged at a level below the conveying surface, preferably in the receiving groove. According to a particular embodiment, the complete wiper blade is arranged at a level below the conveying surface.

According to a further development of the invention, the holding section of the wiper blade in the receiving groove is secured from sliding out of the receiving groove by way of securing means. This relates to a lateral sliding-out from the receiving groove as well as to a sliding-out from the receiving groove towards the conveying element.

Lateral limitation structures, in particular lateral limitation elements can be provided, for example, which limit the lateral movement of the holding section and, as the case may be, also the movement of the holding section to the conveying element.

According to a particular embodiment variant, the holding section can be designed, in plane view, in a T-shaped manner and be inserted into a T-shaped groove. The T-shaped design prevents a lateral sliding-out from the receiving groove as well as a sliding-out to the front to the conveying element.

Securing elements that are led transversely through the receiving groove as well as through recesses in the holding section and, thus, secure the holding section against sliding out laterally and against sliding out towards the conveying element, can moreover also be provided. The securing elements can be securing pins or securing bolts.

The securing means for securing against sliding out laterally or sliding out towards the conveying element provide the holding section preferably with somewhat lateral play or play towards the conveying element, so no jamming of the holding section occurs and the floating mounting is not compromised.

The wiper blade, however, does not necessarily have to be secured from sliding out of the receiving groove via separate securing means. The wiper blade, for example, can also be secured against sliding out of the receiving groove counter to the conveying direction by way of the flexible wiper lip bearing on the conveying element.

The receiving blade forms a receiving surface, onto which the foreign objects are conveyed from the conveying surface of the conveying element via the wiper lip in the framework of the wiping procedure which is yet described hereinafter. The receiving blade moreover forms a step protection in the head-end region.

The receiving blade preferably is formed in a rigid manner.

The receiving blade preferably is arranged in the extension of the conveying surface.

The receiving surface preferably is designed in a plane or level manner. The receiving surface, for example, has a horizontal alignment. The receiving surface can also be inclined in an obliquely falling manner in the conveying direction, as the case may be towards a capture container. The inclination can for example be greater than 0° (angle degrees) and smaller than 20°, in particular smaller than 15°. The inclination is to assist a conveying of the foreign objects on the receiving surface in the conveying direction of the conveying element by way of gravity.

According to a further development of the invention, the receiving blade is connected to the conveying device in a manner such that oscillations, in particular vibrations, which are triggered by the movement of the conveying element or a drive motor, are transmitted onto the receiving blade. The receiving blade is set into oscillation, in particular into vibration by way of this. The oscillations or vibrations include a movement in the vertical direction.

The connection preferably is of such a nature that the oscillations or vibrations even increase in the receiving blade. The receiving blade in particular is thus designed as a vibration conveying element.

The receiving blade in this context in particular is actively connected to the wiper blade in a manner such that oscillation, in particular vibration, which is caused by the movement of the conveying element, is transmitted from the conveying element via the wiper blade onto the receiving blade.

The receiving blade preferably is oscillatorily fastened or mounted relative to the support structure of the conveying device for this. The receiving blade can, e.g., be elastically mounted. Thus, the receiving blade can be connected to the conveying device or its support structure, in a direct manner or indirectly via elastic connection means, such as rubber buffers. The elastic connection means represent a movable mounting.

It is also possible for the receiving blade to be connected with play to the conveying device or its support structure via a loose connection.

The receiving groove preferably is arranged below the receiving surface of the receiving blade. The receiving groove in particular is arranged below the receiving blade. Accordingly, the wiper blade with its holding section is held or mounted in the receiving groove below the receiving surface or the receiving blade.

According to a further development of the invention, the receiving groove is delimited to the top by the receiving blade and to the bottom by a transverse bar of the conveying device. The receiving blade and the transverse bar are thereby spaced from one another by a spacer bar, which is arranged between the receiving blade and the transverse bar, amid the formation of the receiving groove. The extension of the spacer bar towards the conveying element is accordingly smaller than the corresponding extension of the receiving blade and the transverse bar.

The conveying device can include a face-side cover plate at the head-end of the front head-end region. This terminates the conveying device at the head-end.

The cover plate and the transverse bar can be connected to one another at an angle, such as 90°. The transverse bar can be designed together with the cover plate as one part.

The cover plate and the transverse bar can be of plastic or metal. The cover plate and the transverse bar can, for example, be designed as angled sheet.

The cover plate can be releasably connected to the support structure of the conveying device, in particular to lateral frame profiles. Thus, the cover plate can include hang-in elements, via which the cover plate can be hung on hang-in openings of the support structure, in particular on lateral frame profiles.

The cover plate, as the case may be together with the transverse bar, can also be part of the support structure and form a transverse strut.

If the cover plate and the transverse bar are connected to one another, then, for example, the complete wiper device, as the case may be together with a capture container, can be assembled and disassembled on the conveying device in one step as a subassembly, for example, by way of the releasable connection of the cover plate to the support structure.

The receiving blade and the transverse bar can be formed from metal or plastic. The receiving blade and the transverse bar in particular are present as sheet or plate elements.

According to a further development of the invention, the wiper device includes a capture container. The capture container forms a receiving space for foreign objects. The capture container is arranged at the head-end of the front head-end region. The capture container preferably extends at least over the width of the conveying element.

The capture container preferably is releasably connected to the conveying device. The releasable connection preferably should be able to be created and released again without tools.

The capture container preferably can be attached on a cover plate at the head end of the front head-end region.

The capture container, for example, can be hung on the conveying device, such as on the cover plate, and unhung again, via suitable connection elements.

Thus, the capture container can comprise hang-in elements, by way of which the capture container can be hung into hang-in openings on the conveying device, preferably on the cover plate, and unhung again.

The capture container includes a capture opening. The capture opening preferably is covered by a cover element. The cover element includes at least one through-opening for the passage of foreign objects into the receiving space of the capture container. The cover element, e.g., serves as a tread protection. The cover element can be a cover grid.

The cover element preferably can be arranged connecting to the receiving blade. The cover element preferably is arranged in the extension of the conveying surface.

The capture container with the capture opening connects to the receiving blade.

The receiving blade preferably forms a transport surface for the transport of foreign objects away from the conveying element, preferably into the capture container.

The described capture container represents an aspect of the invention that is independent of the further design of the wiper device.

Accordingly, the protective subject-matter is also to include a conveying device that includes a revolvingly guided, extensively extended conveying element that forms a conveying section with a conveying surface, and forms a return section arranged below the conveying section, wherein the conveying element is deflected in each case into two head-end regions that are spaced from one another along the conveying direction.

The conveying device may serve as a worker-rider belt.

The conveying device includes a wiper device for wiping foreign objects that are carried along on the conveying surface of the conveying element, is arranged in a head-end region that is at the front in the conveying direction and in which the conveying element is deflected from the conveying section into the return section, and the wiper device includes a capture container that is for receiving the wiped-away foreign objects and is attached on the front head-end region.

The capture container preferably is releasably attached on the conveying device. Moreover, the features disclosed in this description in the context of the capture container are also valid here.

If then small parts as foreign objects fall onto the conveying surface of the conveying element, then these are conveyed on the conveying element to the front head-end region of the conveying device. The foreign objects, however, in the region of the deflection in the head-end region are prevented from going with the conveying element into the deflection, by way of a wiper lip bearing on the conveying element. The foreign objects in contrast are wiped away from the conveying element by the wiper lip. The foreign objects are transported via the wiper lip onto the receiving surface of the receiving blade.

The foreign objects on the receiving blade are moved towards the head end due to oscillation or vibration of the receiving blade. The foreign objects at the head-end either drop from the conveying device onto the floor, or, if present, into a capture container attached at the head end.

The capture container only needs to be emptied from time to time. A cleaning of the surroundings from dropped-down foreign objects is not necessary.

The extensively extended conveying element forms a rest (support) surface for the conveyed objects, for animals and also for persons. The rest surface is called the conveying surface.

The extensively extended conveying element in particular is designed in a continuous (endless) manner.

The conveying element can be designed in a single-part manner and, for example, can be a conveyor belt.

The conveying element, however, is particularly designed in a multi-part manner The conveying element, despite this, preferably has a continuous conveying surface. A continuous conveying surface means that the plane character of the conveying surface is also retained over the connection region between the individual links/members of the conveying element.

Thus, the conveying element in particular is a linked conveying chain in each case of individual chain links, which are articulately connected to one another. Such a conveying chain can, e.g., be an extensively extended link chain, a modular belt, a plate chain, a modular belt chain or a mat chain. The conveying chain can also be a hinge belt chain or a plate belt chain. The chain links of the conveying chain can, e.g., be of plastic. Such a conveying chain in the embodiment of a mat chain is described, for example, in the published document EP 1 743 855 B1.

The use of a conveying chain of the type described above has the advantage that its conveying surface can be loaded to a much greater extent than the conveying surface of a conveyor belt, due the comparatively solid design of the chain links.

Conveying chains moreover have the characteristic that these form a polygonal outer contour in cross section in the deflection. The wiper lip, which is bears on the outer contour of the conveying element or is supported on this, is brought into an oscillatory movement by the conveying movement of the conveying chain, on account of this polygonal outer contour. The oscillatory movement in particular corresponds to a succession of alternating position changes. The oscillatory movement of the wiper blade is transmitted onto the adjacent receiving blade, which is accordingly set into oscillation or vibration.

An assisting, high-frequency oscillation can be produced by way of the sliding friction between the wiper lip and the conveying element, and this oscillation is introduced into the wiper blade.

The conveying device in particular comprises a support frame with lateral longitudinal profiles as well as transverse profiles connecting the longitudinal profiles to one another.

The conveying device in particular is an already initially mentioned worker-rider belt. Worker-rider belts, as has been mentioned, are applied in industrial manufacture, in which working steps, such as assembly steps must be carried out on conveyed objects of a production line.

The worker is co-moved on a worker-rider belt parallel to the object in the conveying direction, in order to give the worker a sufficient amount of time for him to carry out his working steps. The worker is co-moved with the object, e.g. in a speed-synchronous manner. Such a worker-rider belt can have a length of a few metres, e.g. of 6 to 60 m.

The invention moreover relates to a method for separating foreign objects from a conveying surface of a conveying device with a wiper device, as described above. The method includes the following steps:

wiping foreign objects from a conveying surface of the conveying element, which is moved in the conveying direction to the wiper blade and at the wiper blade downwards past the wiper blade, by way of the wiper blade;

further conveying the foreign objects from the wiper blade onto the receiving surface of the receiving blade by way of an oscillating movement of the wiper blade;

conveying the foreign objects further in the conveying direction on the receiving surface by way of an oscillating movement of the receiving blade.

According to a further development of the method, the wiper device includes a capture container with a capture opening, which connects to the receiving surface in the conveying direction, wherein the foreign objects are conveyed on the receiving surface in the conveying direction from the receiving surface into the capture container by way of the oscillatory movement of the receiving blade.

According to a further development of the method, the capture container, as already described further above, is releasably attached on the conveying device. The capture container is removed from the conveying device for emptying, in particular hung, and is attached onto the conveying device, in particular hung on the conveying device again after emptying.

The conveying device according to the invention has the advantage that foreign objects on the conveying element are separated from the conveying element by way of the wiper device. The foreign objects in the region of the deflection no longer get into the inside of the conveying device, by which means a damage of the conveying device is prevented and operational disruption is avoided.

The wiper device is a self-cleaning device that can be operated without a separate drive and without outside assistance, and automatically cleans the conveying surface of foreign objects and keeps the direct working environment free of foreign matter or objects.

The capture of the foreign objects in a capture container permits the leading-back of the foreign objects, which as a rule are assembly parts, into the processing cycle. The contamination of the environment of the conveying device with foreign objects is also avoided due to the application of a capture container.

BRIEF DESCRIPTION OF THE DRAWINGS

The subject-matter of the invention is hereinafter explained by way of an embodiment example which is represented in the accompanying drawings. In each case are schematically shown in:

FIG. 8: a plan view of a production line with worker-rider belts; and,

DETAILED DESCRIPTION OF THE INVENTION

Figure 1:
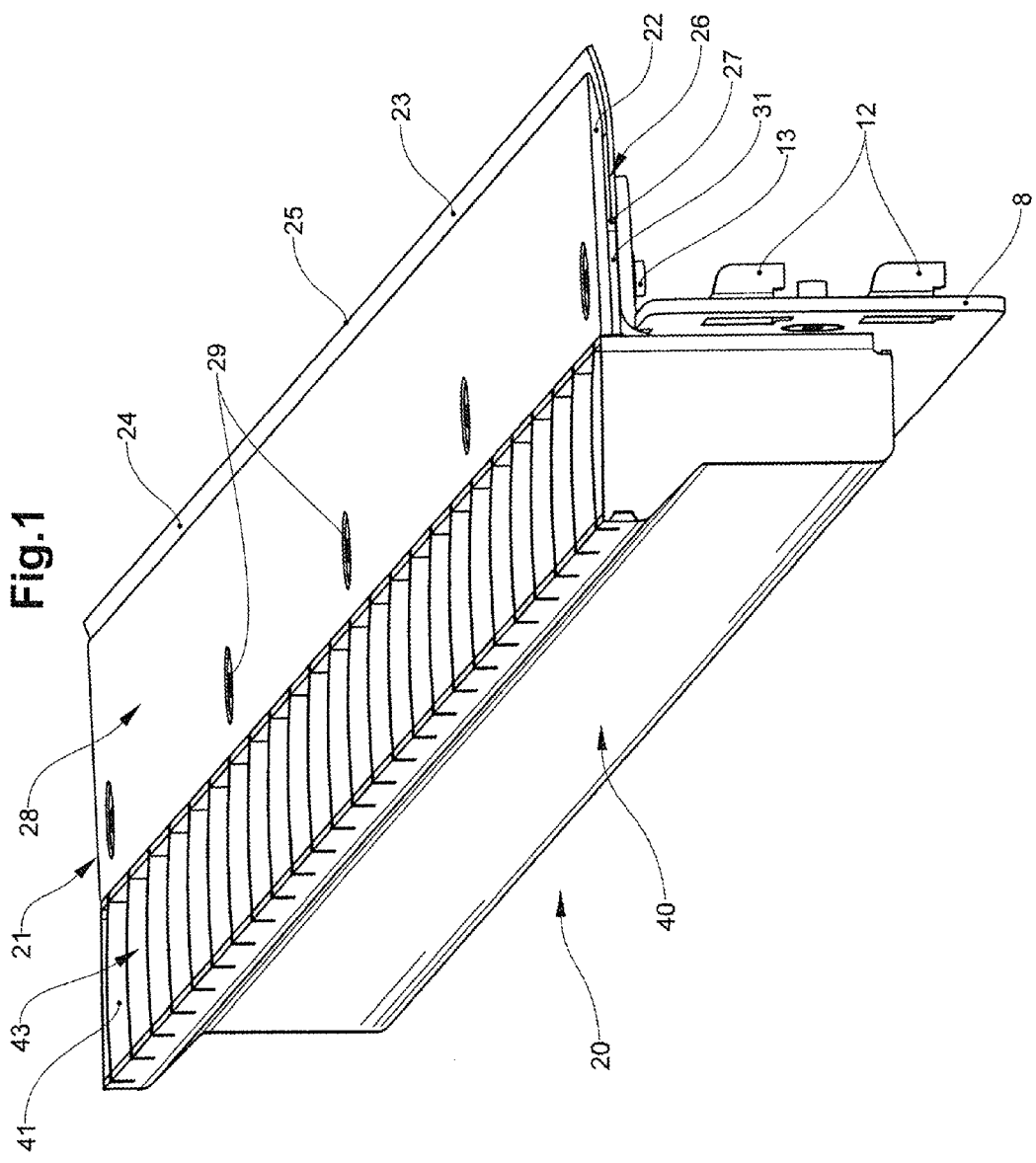
FIG. 1: a perspective representation of a wiper device according to the invention.

Basically, the same parts in the figures are provided with the same reference numerals.

FIG. 1 shows an embodiment of a wiper device 20 according to the invention. The wiper device 20 includes a wiper unit 21 with a receiving blade 22 that forms a plane receiving surface 28. The receiving blade 22 is connected to a transverse bar 7 of a conveying device 1 by way of connection screws 29 (see also FIGS. 3, 4, 6, 7a-7c and 9).

A spacer bar 31 is arranged between the receiving blade 22 and the transverse bar 7, but this however to the conveying element 2 is designed in shortened manner compared to the receiving blade 22 and the transverse bar 7, so that the receiving blade 22 and the transverse bar 7 form a receiving groove 27, which is open to the conveying element 2 and which is closed to the head-end by the spacer bar 31 (See FIGS. 7a-7c and 9).

A wiper blade 23 of plastic with a holding section 26 is inserted into the receiving groove 27 and is floatingly mounted along an axis transverse to the conveying surface, i.e. vertically. The holding section 26 in the receiving groove 27 has corresponding play along the axis transverse to the conveying surface 10. The wiper blade 23 with its holding section 26 is accordingly arranged below the receiving blade 22.

The wiper blade 23 forms a wiper lip 24, which projects beyond the receiving blade 22 in the direction of the conveying element 2. The wiper lip 24 is bent upwards. The wiper lip 24 lies on the conveying element 2, as can be deduced from FIGS. 7a to 7c, as well as FIG. 9. The wiper lip 24 for this in particular has a biasing. The face edge 25 of the wiper lip 24 which is supported on the conveying element 2 follows the outer contour of the conveying element 2 moved past the wiper lip 24. Accordingly, the face edge 25 has a temporally changing support position.

The receiving blade 22 at its end section, which is directed to the conveying element 2 toward the wiper blade 23 has a bevelling, which assists the bending of the wiper lip 24.

Figure 2:
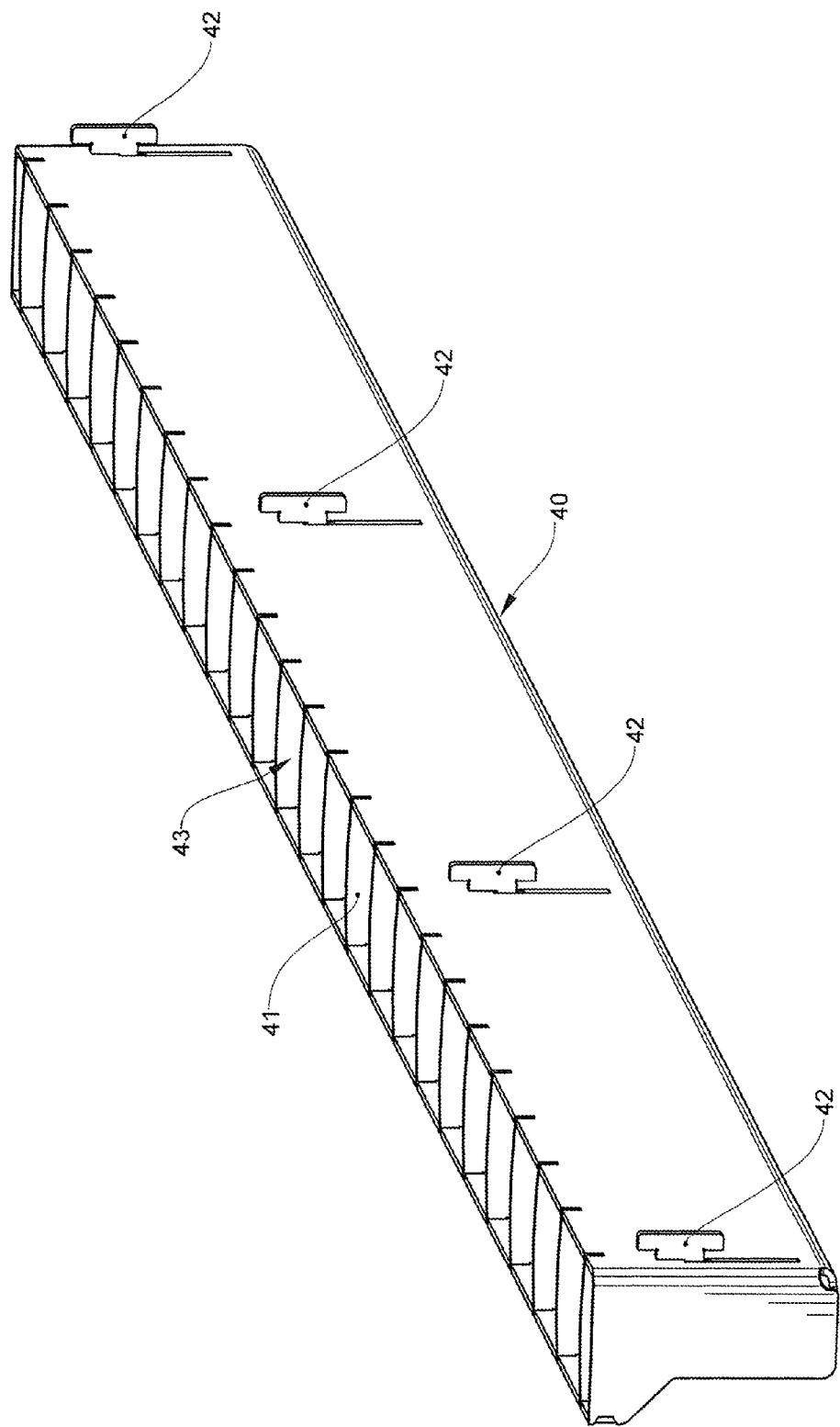
FIG. 2: a perspective representation of the capture container of the wiper device according to FIG. 1.

The wiper device 20 moreover includes a capture container 40 which, via hang-in elements 42 (see also FIG. 2), is hung into hang-in openings 11 of a cover plate 8 of the conveying device 1. The capture container 40 can be quickly and simply unhooked for emptying and hung or mounted in again, in this manner The capture container 40 includes a capture opening 43 that is covered by a cover grid 41. The cover grid 41 is to prevent larger objects that do not belong in the capture container 40, from inadvertently getting into the capture container. The cover grid 41 also serves as step protection.

The cover plate 8 itself likewise includes a hang-in element 12, via which the cover plate 8 can be releasably hung into hang-in openings on the lateral frame of the conveying device 1. The cover plate 8 in this manner can likewise easily be assembled and disassembled in this manner, by which means a rapid access to the deflection element in the head-end region is ensured.

Figure 3:
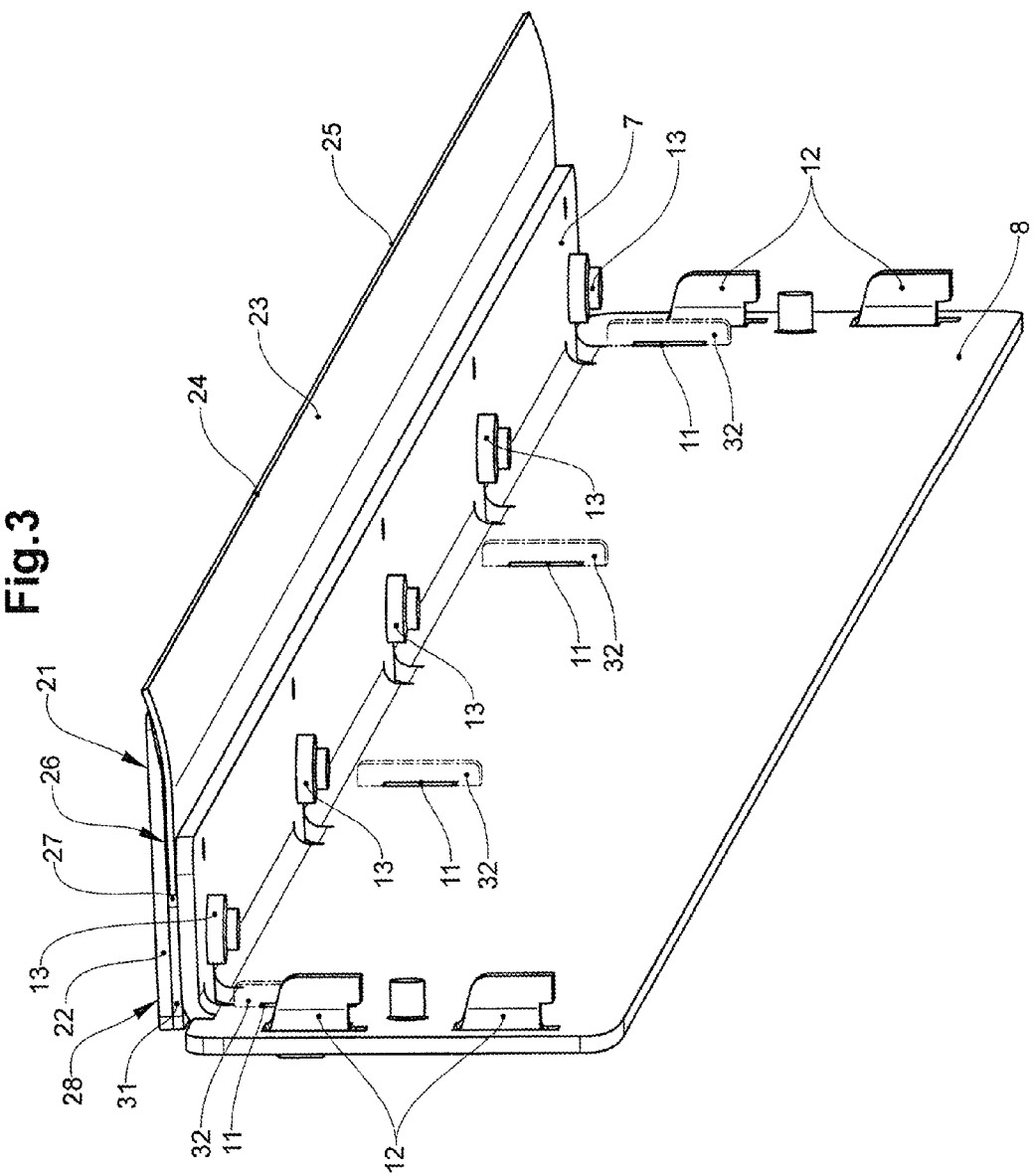
FIG. 3: a perspective representation of a cover plate with a transverse bar of the conveying device.
Figure 4:
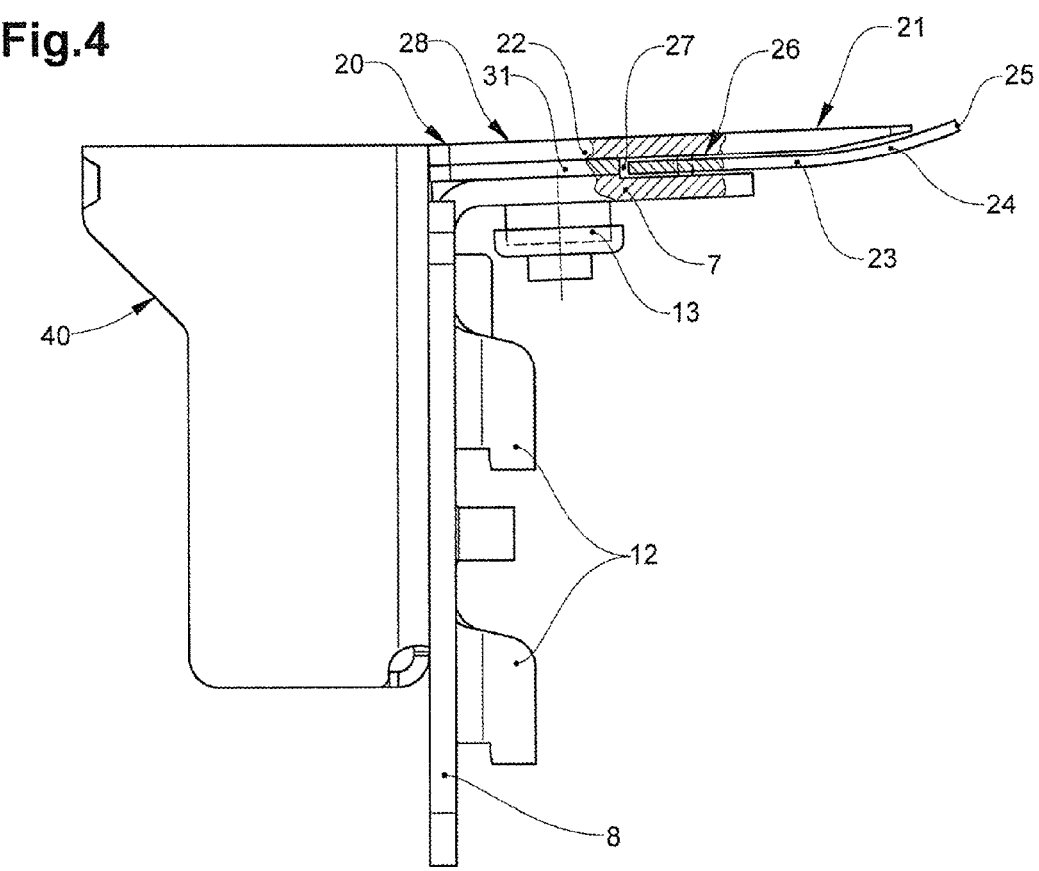
FIG. 4: a lateral view of the wiper device according to FIG. 1.

The transverse bar 7 and the cover plate 8 are designed in a single-part manner in the form of an angled sheet (see also FIG. 3). Thus, the complete wiper device 20 can be assembled and disassembled in one step as a subassembly via the hang-in connection of the cover plate to the lateral frame.

Rubber buffers 13 are attached on the transverse bar 7, and these permit an elastically damping fastening of the receiving blade 22 on the conveying device 1 via the transverse bar 7. The receiving blade 22 is oscillatorily mounted relative to the conveying device 1 or its support structure by way of this.

Securing means are provided, so that the wiper blade 23 which is floatingly mounted in the receiving groove 27 does not "wander" out of the receiving groove 27 laterally or towards the conveying element 2. These securing means secure the holding section 26 from sliding out of the receiving groove 27.

Figure 6:
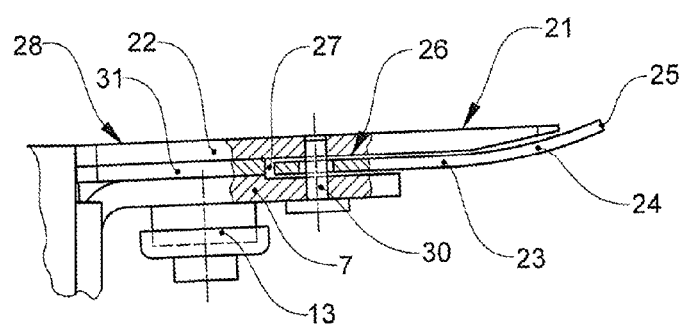
FIG. 6: a lateral view of the wiper device with a further alternative fastening of the wiper blade.

The securing means according to FIG. 6 include pin elements 30 that are led transversely through the receiving groove 27 and through recesses in the holding section 26.

The pin elements 30 are fixed from falling out, in the receiving blade 22 and/or the transverse bar 7.

Figure 5:
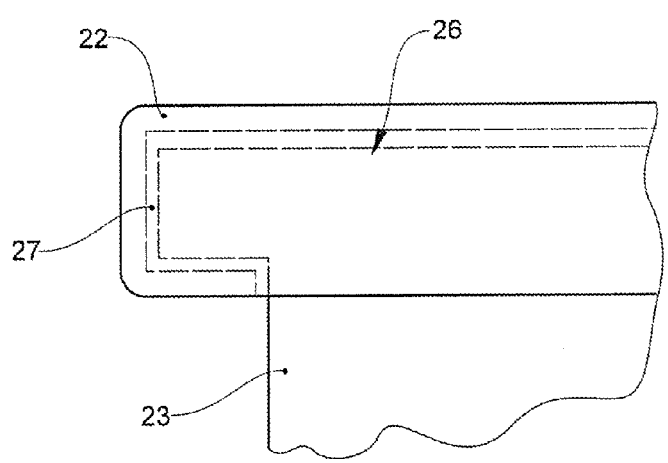
FIG. 5: a plan view of the receiver blade with an alternative fastening of the wiper blade.

FIG. 5 shows a further alternative or additional variant for securing the wiper blade 23 from sliding out of the receiving groove 27. The holding section 26 here is designed, in a plane view, in a T-shaped manner and engages into the correspondingly designed receiving groove 27. A lateral sliding-out, as well as a sliding-out from the groove opening in the direction of the conveying element 2 is not possible due to the T-shaped engagement into the receiving groove 27.

Figure 7A:
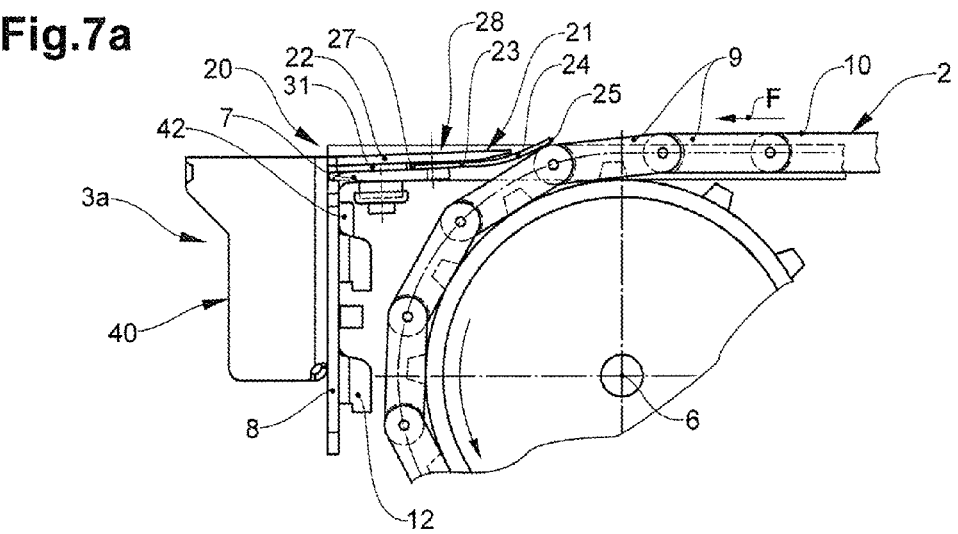
FIG. 7a-7c: a lateral view of the conveying device with a wiper device, from the head-end region.
Figure 7B:
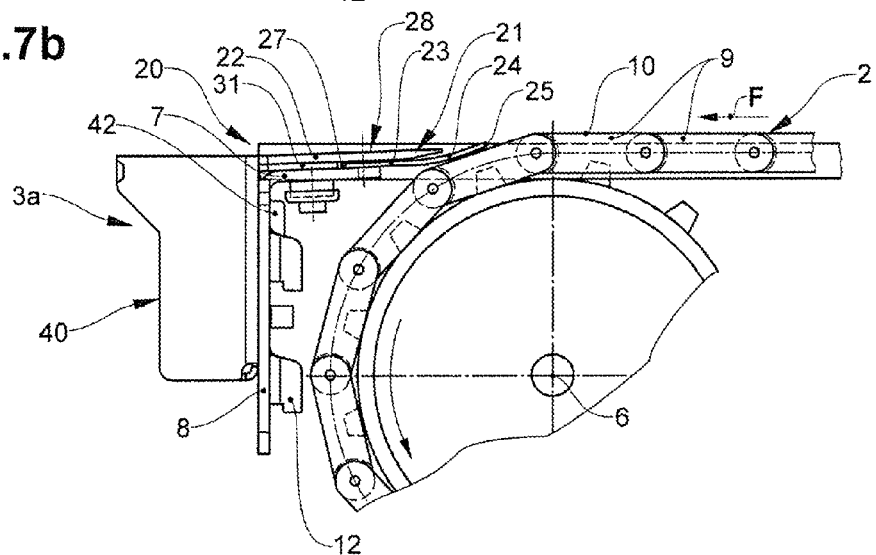
Figure 7C:
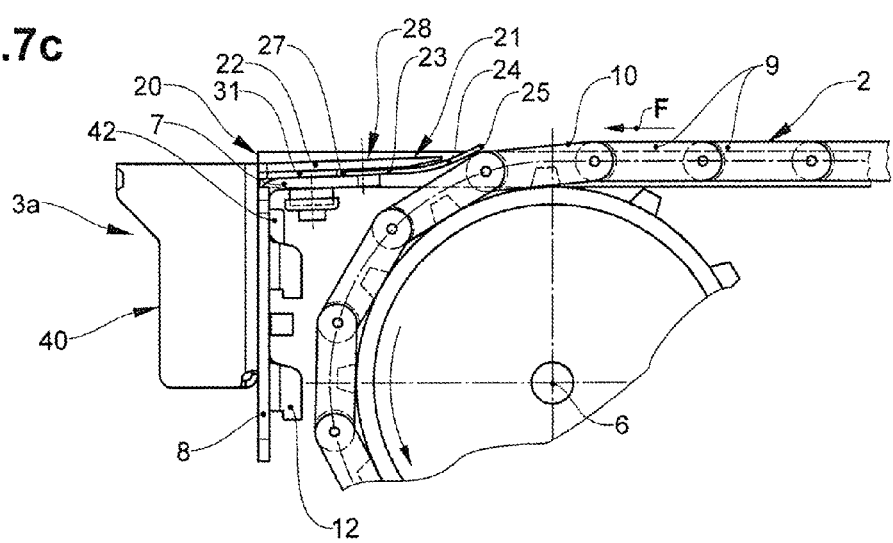
Figure 9:
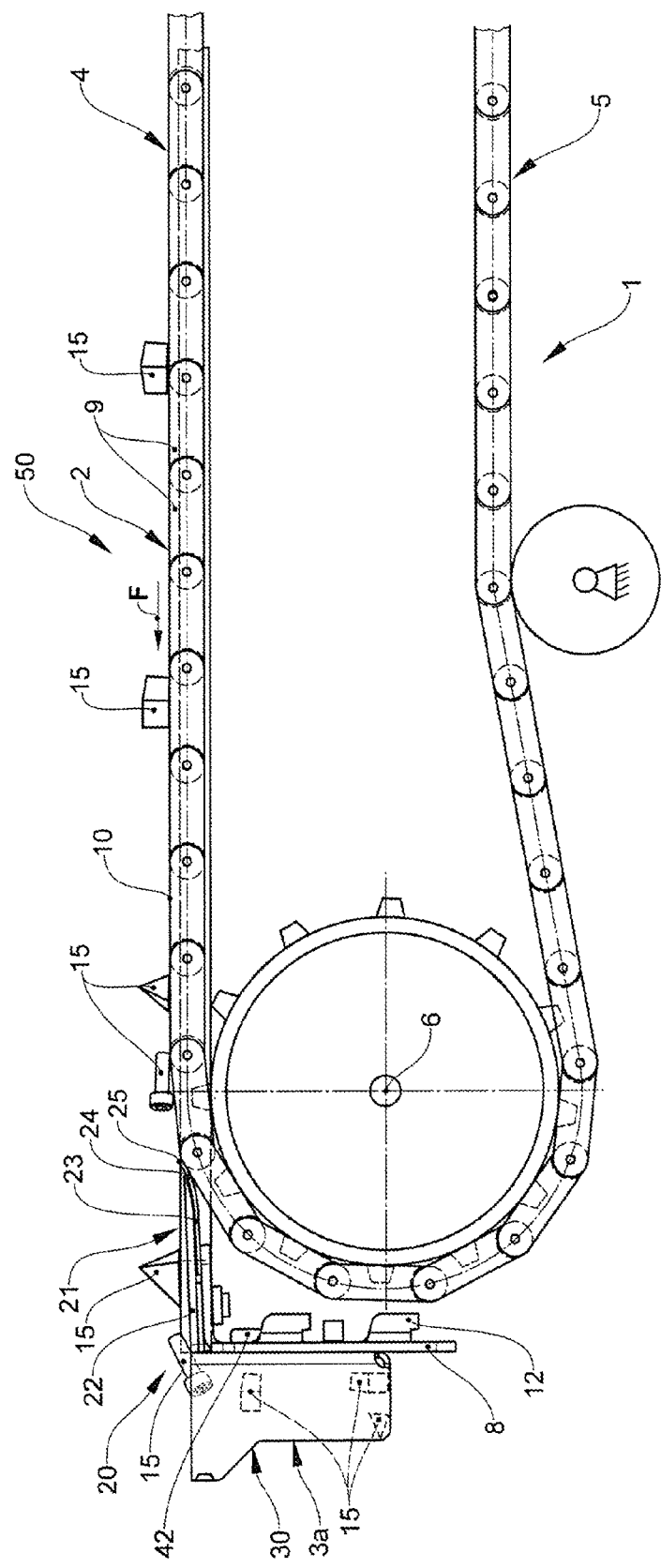
FIG. 9: a lateral view of a worker-rider belt according to FIG. 8, from the head-end region.

The conveying element 2 according to FIGS. 7a to 7c as well as FIGS. 8 and 9 is designed as a modular belt chain and consists of a multitude of chain links, which are connected to one another in manner pivotable relative to one another, via connection pivots. The modular belt chain 2 forms a polygonal outer contour in the deflection.

The method for wiping foreign objects 15 away from the conveying surface 10 of the conveying element 2 can be explained by way of FIGS. 7a to 7c.

The modular belt chain 2 is driven in the conveying direction F by a drive device (not shown). The modular belt chain 2 is led into a deflection about a deflection axis 6, in the front head-end region. The modular belt chain 2 in the deflection changes over from a conveying section 4 into a return section 5.

The wiper blade 23 with its wiper lip 24 below the level of the conveying surface 10 and in an upper region of the deflection bears on the modular belt chain 2. The wiper lip 24 due to the biasing follows the contour of the modular belt chain which is moved past.

The wiper lip 24, which is pressed onto the modular belt chain 2, is set into oscillation movement due to the polygonal outer contour of the moved modular belt chain 2 in the deflection. This movement is transmitted from the wiper blade 23 onto the receiving blade 22, which is oscillatorily mounted with respect to the conveying device 1 and as a result is brought into oscillation.

The foreign objects 15, which are now conveyed on the modular belt chain 2 to the front head-end region 3a, run onto the wiper lip 24 in the region of the deflection and are wiped away from the modular belt chain 2 at the wiper lip 24. The foreign objects 15 due to their moment of inertia as well as due to the oscillating wiper lip 24 are brought via the wiper lip 24 onto the receiving surface 28 of the receiving blade 22.

The foreign objects 15 are kept in motion on the receiving surface on account of the oscillation or vibration of the receiving blade 22. Although the foreign objects have an essentially non-directional movement on the receiving surface, they are finally led to the capture container 40, where the foreign objects 15 drop through the cover grid 41 into the capture container 40.

A receiving surface 28, which is inclined towards the capture container 40, encourages the movement of the foreign objects 15 towards the capture container 40 in a manner assisted by gravity, since the movement of the foreign objects 15 on the receiving blade 22 is essentially non-directional, as mentioned.

FIG. 8 shows a production line with worker-rider belts 50, which are arranged on both sides of the production line. The worker-rider belts 50 have modular belt chains 2 that are deflected in each case at a front and rear head-end region 3a, 3b.

A wiper device 20 of the already described type is arranged on the front head-end region 3a.

FIG. 9 shows a lateral view of the worker-rider belt 50 from the front head-end region 3a.

The invention claimed is:

1. A worker-rider belt with a revolvingly led, extensively extended conveying element, which forms a conveying section with a conveying surface for a worker, and a return section arranged below the conveying section, and the conveying element is deflected in each case in two head-end regions, which are spaced from one another along the conveying direction, wherein
    a wiper device for wiping foreign objects led along on the conveying surface of the conveying element is arranged in a head-end region, which is at the front in the conveying direction and in which the conveying element is deflected from the conveying section into the return section, and the wiper device comprises a wiper unit with a receiving blade running transversely to the conveying direction as well as a wiper blade, which is mounted on the wiper unit and which forms a flexible wiper lip projecting towards the conveying element beyond the receiving blade,
    wherein the receiving blade is designed as a vibration conveying element and mounted on the worker-rider belt in a manner such that vibrations, which are triggered by the movement of the conveying element or a drive motor, are transmitted onto the receiving blade, such that foreign objects which are transported from the conveying element via the wiper lip onto the receiving blade, are moved on the receiving blade towards the head end due to vibrations of the receiving blade.

2. The worker-rider belt according to claim 1, wherein the wiper unit forms a receiving groove, in which the wiper blade via a holding section is mounted with play along an axis transverse to the conveying surface.

3. The worker-rider belt according to claim 2, wherein the wiper blade can be inserted into the receiving groove.

4. The worker-rider belt according to claim 1, wherein the receiving blade forms a receiving surface that is inclined dropping in an oblique manner in the conveying direction.

5. The worker-rider belt according to claim 1, wherein the holding section and the wiper blade are arranged at a level below the conveying surface.

6. The worker-rider belt according to claim 1, wherein the wiper is formed from plastic.

7. The worker-rider belt according to claim 1, wherein the wiper lip is bent upwards.

8. The worker-rider belt according to claim 2, wherein the wiper blade in the receiving groove is secured against sliding out of the receiving groove via securing means.

9. The worker-rider belt according to claim 2, wherein the receiving groove is arranged below the receiving surface of the receiving blade and below the receiving blade.

10. The worker-rider belt according to claim 1, wherein the wiper device comprises a capture container with a capture opening wherein the capture container is arranged, preferably in a releasable manner, at the head end of the worker-rider belt, wherein the capture opening connects to the receiving blade.

11. The worker-rider belt according to claim 1, wherein the conveying element is designed in a multi-part manner.

12. A worker-rider belt with a revolvingly led, extensively extended conveying element, which forms a conveying section with a conveying surface, and a return section arranged below the conveying section, and the conveying element is deflected in each case in two head-end regions, which are spaced from one another along the conveying direction, wherein
    a wiper device for wiping foreign objects that are led along on the conveying surface of the conveying element is arranged in a head-end region, which is at the front in the conveying direction and in which the conveying element is deflected from the conveying section into the return section, and the wiper device comprises a capture container that is for receiving wiped-off foreign objects and is releasably attached at the front head-end region.

13. A method for separating foreign objects from a conveying surface of a worker-rider belt with a wiper device according to claim 1, comprising the steps of:
    wiping foreign objects by way of the wiper blade from the conveying surface of the conveying element, which is moved in the conveying direction towards the wiper blade and at the wiper blade downwards past the wiper blade;
    conveying the foreign objects further from the wiper blade onto the receiving surface of the receiving blade by way of an oscillating movement of the wiper blade;
    conveying the foreign objects further in the conveying direction on the receiving surface by way of vibration of the receiving blade.

14. The method according to claim 13, wherein the wiper device comprises a capture container with a capture opening that connects to the receiving surface in the conveying direction, and the foreign objects are conveyed on the receiving surface in the conveying direction from the receiving surface into the capture container by way of vibration of the receiving blade.

15. The method according to claim 13, wherein the capture container is releasably attached on the worker-rider belt, and the capture container is removed from the worker-rider belt for emptying, and, after emptying, is re-attached onto the worker-rider belt.

\* \* \* \* \*